United States Patent
Gretarsson et al.

(10) Patent No.: US 9,683,673 B2
(45) Date of Patent: Jun. 20, 2017

(54) MAGNETIC VALVE WITH A ONE PIECE HOUSING

(71) Applicant: Danfoss A/S, Nordborg (DK)

(72) Inventors: Kristjan Arnor Gretarsson, Kolding (DK); Michael Birkelund, Middelfart (DK)

(73) Assignee: Danfoss A/S, Norborg (DK)

( * ) Notice: Subject to any disclaimer, the term of this patent is extended or adjusted under 35 U.S.C. 154(b) by 90 days.

(21) Appl. No.: 14/437,731

(22) PCT Filed: Sep. 11, 2013

(86) PCT No.: PCT/DK2013/050290
§ 371 (c)(1),
(2) Date: Apr. 22, 2015

(87) PCT Pub. No.: WO2014/067521
PCT Pub. Date: May 8, 2014

(65) Prior Publication Data
US 2015/0292642 A1    Oct. 15, 2015

(30) Foreign Application Priority Data

Oct. 29, 2012 (DK) ................................ 2012 00665
Jan. 7, 2013 (DK) ................................ 2013 00007

(51) Int. Cl.
*F16K 31/06* (2006.01)
*F16K 27/02* (2006.01)

(52) U.S. Cl.
CPC .............. *F16K 31/06* (2013.01); *F16K 27/02* (2013.01); *F16K 27/029* (2013.01); *F16K 31/0665* (2013.01)

(58) Field of Classification Search
CPC .... F16K 27/029; F16K 31/06; F16K 31/0665; Y10T 137/5987

(Continued)

(56) References Cited

U.S. PATENT DOCUMENTS 3,107,893 A    10/1963    Bashe
5,370,354 A    12/1994    Kunz
(Continued)

FOREIGN PATENT DOCUMENTS

CN    101245875 A    8/2008
CN    201237005 Y    5/2009
(Continued)

OTHER PUBLICATIONS

International Search Report for PCT Serial No. PCT/DK2013/050290 dated Dec. 16, 2013.

(Continued)

*Primary Examiner* — Matthew W Jellett
(74) *Attorney, Agent, or Firm* — McCormick, Paulding & Huber LLP

(57) ABSTRACT

A magnetic valve (1) in which a valve housing (2), an armature tube (3), an inlet connection (4) and an outlet connection (5) form a single valve part is provided. An armature (9) made from a soft magnetic material is arranged movably inside the armature tube (3). A coil (16) is arranged externally to the armature tube (3) in such a manner that the armature tube (3) and the armature (9) are arranged inside the windings of the coil (16). A valve closing element (10) is connected to the armature (9) and is movable between a position in which it abuts a valve seat (8) and positions in which it does not abut the valve seat 8, thereby closing and opening the valve (1). In one embodiment, the flow path through the valve (1) from the inlet opening (6) to the outlet opening (7) does not pass through the windings of the coil (16). In another embodiment, the armature tube (3) comprises a closed end part (3a).

25 Claims, 7 Drawing Sheets

(58) Field of Classification Search
USPC .................................. 137/614.2; 251/129.15
See application file for complete search history.

(56) References Cited

U.S. PATENT DOCUMENTS

| | | | | |
|---|---|---|---|---|
| 6,268,784 | B1 | 7/2001 | Feigel et al. | |
| 6,293,513 | B1* | 9/2001 | Birkelund | F16K 31/408 251/30.03 |
| 6,546,952 | B1* | 4/2003 | Martin | F16L 55/1152 137/15.18 |
| 6,712,088 | B2* | 3/2004 | Gamou | F16K 15/026 137/341 |
| 7,044,111 | B2 | 5/2006 | Cook | |
| 8,070,129 | B2* | 12/2011 | Makino | F16K 27/041 251/129.15 |
| 8,555,916 | B2* | 10/2013 | Ro | F16K 31/404 137/497 |
| 8,578,959 | B2* | 11/2013 | Hoang | E03F 1/006 137/202 |
| 2002/0079006 | A1 | 6/2002 | Entwistle et al. | |
| 2006/0097830 | A1 | 5/2006 | Forsythe et al. | |

FOREIGN PATENT DOCUMENTS

| | | |
|---|---|---|
| CN | 201262268 Y | 6/2009 |
| CN | 101676591 A | 3/2010 |
| DE | 10130629 C1 | 3/2003 |
| FR | 806223 A | 12/1936 |
| GB | 378652 A | 8/1932 |
| WO | 02103720 A1 | 12/2002 |
| WO | 2004104463 A1 | 12/2004 |

OTHER PUBLICATIONS

Communication Pursuant to Article 94(3) EPC in European Patent Application No. EP13762055 dated Feb. 19, 2016.
Communication pursuant to Article 94(3) EPC in European Application No. EP 13 762 055.5 dated Jul. 20, 2016.

* cited by examiner

MAGNETIC VALVE WITH A ONE PIECE HOUSING

CROSS-REFERENCE TO RELATED APPLICATION

This application is entitled to the benefit of and incorporates by reference subject matter disclosed in the International Patent Application No. PCT/DK2013/050290 filed on Sep. 11, 2013 and Danish Patent Application Nos. PA 2012 00665 filed Oct. 29, 2012 and PA 2013 00007 filed Jan. 7, 2013.

FIELD OF THE INVENTION

The present invention relates to a magnetic valve in which at least a valve housing, an armature tube, an inlet connection and an outlet connection form a single valve part. The present invention further relates to a method for manufacturing such a magnetic valve.

BACKGROUND

Magnetic valves normally comprise an armature tube accommodating a movable armature being made from a soft magnetic material, i.e. a material which becomes magnetic when subjected to a magnetic field, e.g. provided by a coil being energized. A coil is arranged around the armature in such a manner, that when the coil is energized, i.e. an electrical current is supplied to the windings of the coil, a magnetic field is induced in the armature, causing the armature to move along an axial direction inside the armature tube.

Magnetic valves further comprise a valve housing accommodating a valve seat and a valve closing element being movable between a position in which it abuts the valve seat and positions in which it does not abut the valve seat. The valve closing element is connected to the armature in such a manner that movements of the armature, due to energizing or de-energizing the coil, causes movements of the valve closing element between abutting and non-abutting positions. When the valve closing element is not arranged in abutment with the valve seat, the valve is open and a flow of fluid through the valve from an inlet opening to an outlet opening is allowed. When the valve closing element is arranged in abutment with the valve seat, the valve is closed and a flow of fluid through the valve is prevented. Thus, the valve can be opened and closed by controlling a supply of electrical current to the coil.

Normally, it is desirable to make the armature tube as thin as possible in order to ensure that the magnetic flux induced by the coil is efficiently conveyed to the armature top. Furthermore, the armature tube must be wear resistant and have a high yield strength, in spite of the low material thickness, in order to ensure that it can resist wear originating, e.g., from the movements of the armature inside the armature tube, and in order to ensure that the armature is capable of withstanding the pressure levels which are anticipated inside the armature tube. To this end, the armature is often made from a hard and wear resistant material, such as austenitic stainless steel, e.g. cold worked austenitic stainless steel.

The valve housing, on the other hand, is normally made from a material which is cheap and which can easily be processed, e.g. brass. Furthermore, the material selected for the valve housing should be compatible with the fluid which is flowing through the valve, e.g. a refrigerant.

U.S. Pat. No. 6,268,784 discloses a magnetic valve for liquid and gaseous working media. The valve includes a first cylindrical housing part that is encompassed on its outside by a magnetic coil and has a cylindrical recess inside which extends in an axial direction to accommodate and guide an armature. A second cylindrical housing part is arranged coaxially to the first housing part and includes a cylindrical recess extending in an axial direction, the said recess being in connection to outside valve ports and in which a valve seat cooperating with a tappet is arranged. The first and second housing parts form a housing which is made in one piece of a ferromagnetic material.

DE 101 30 629 discloses a valve assembly for a magnetic valve, the valve assembly comprising a housing, a valve element with an armature, which is arranged in the housing, a valve seat, and a coil.

U.S. Pat. No. 7,044,111 discloses a purge valve including an actuator, a valve body, and a valve closure member disposed in the valve body. The actuator is disposed along a longitudinal axis, and includes an electromagnetic coil having a hollow core extending along the longitudinal axis, a stator disposed in the hollow core, and a permanent magnet armature disposed proximate the stator. The valve body is disposed proximate the actuator, and defines a flow passage extending along the longitudinal axis.

SUMMARY

It is an object of embodiments of the invention to provide a magnetic valve which is easy and cost effective to manufacture.

It is a further object of embodiments of the invention to provide a magnetic valve in which it is possible to provide maintenance to the coil or to replace the coil, without risking leaking of fluid from the valve.

It is an even further object of embodiments of the invention to provide a cost effective method for manufacturing a magnetic valve.

According to a first aspect the invention provides a magnetic valve comprising:
  a valve housing,
  an armature tube having an armature made from a soft magnetic material arranged movably therein,
  a coil arranged externally to the armature tube in such a manner that the armature tube and the armature are arranged inside the windings of the coil,
  an inlet connection defining an inlet opening allowing a flow of fluid to enter the valve,
  an outlet connection defining an outlet opening allowing a flow of fluid to leave the valve,
  a valve seat,
  a valve closing element being movable between a position in which it abuts the valve seat, thereby closing the valve and preventing a fluid flow from the inlet opening to the outlet opening, and positions in which it does not abut the valve seat, thereby allowing fluid to pass through the valve from the inlet opening to the outlet opening, via the valve seat, said valve closing element being connected to the armature in such a manner that movements of the armature inside the armature tube determines the position of the valve closing element relative to the valve seat,
wherein at least the valve housing, the armature tube, the inlet connection and the outlet connection form a single valve part, and wherein the flow path through the valve from the inlet opening to the outlet opening does not pass through the windings of the coil.

The valve according to the first aspect of the invention may advantageously be used in a vapour compression system, such as a refrigeration system, an air condition system or a heat pump.

The valve according to the first aspect of the invention comprises a valve housing. In the present context the term 'valve housing' should be interpreted to mean a substantially closed structure defining an outer boundary of the valve and an interior part, through which fluid flows during normal operation of the valve, at least when the valve is in an open position. This will be described further below.

An armature is arranged movably in an armature tube. Thus, the armature can move along a longitudinal direction relative to the armature tube, and the armature tube guides the movements of the armature. The armature is made from a soft magnetic material. In the present context the term 'soft magnetic material' should be interpreted to mean a material which becomes magnetic only when subjected to a magnetic field.

An armature top may further be mounted at an end part of the armature tube, in order to close the armature tube. In this case the armature top may be mounted on the armature tube by means of a snap fit connection, it may be welded onto the armature tube, or it may be mounted in any other suitable way.

As an alternative, the armature tube may have a closed end part. In this case there are no joints between the armature tube and an armature top, and the valve is therefore fluid tight in this region. In this case, an armature top made from a soft magnetic material may be mounted inside the armature tube for receiving the magnetic flux induced by the coil. This will be described in further detail below.

A coil is arranged externally to the armature tube. Thus, the windings of the coil are wound around an outer surface of the armature tube, and the armature tube and the armature are arranged inside the windings of the coil. Accordingly, when the coil is connected to an electrical power source, and thereby energized, a magnetic field is created within the windings of the coil, and thereby the armature becomes magnetic. This causes the armature to move inside the armature tube, along the axial direction.

The valve further comprises an inlet connection defining an inlet opening allowing a flow of fluid to enter the valve, and an outlet connection defining an outlet opening allowing a flow of fluid to leave the valve. The inlet connection and the outlet connection are both of a kind which protrudes from the valve housing, thereby allowing piping or the like to be connected to the valve, in order to allow fluid to be supplied to and delivered from the valve.

The valve further comprises a valve seat and a valve closing element. The valve closing element is movable between a position in which it abuts the valve seat, thereby closing the valve, and positions in which it does not abut the valve seat, thereby opening the valve. In the closed position, fluid is prevented from passing through the valve from the inlet opening to the outlet opening. In the open position, fluid is allowed to pass through the valve from the inlet opening to the outlet opening, via the valve seat. The exact position of the valve closing element, relative to the valve seat, may define an opening degree of the valve.

The valve closing element is connected to the armature in such a manner that movements of the armature inside the armature tube determines the position of the valve closing element relative to the valve seat. Thus, when the coil is energized or de-energized, thereby causing movements of the armature inside the armature tube, the valve closing element is also moved. Accordingly, the valve can be opened and closed by controlling the energy supply to the coil, thereby energizing and de-energizing the coil.

At least the valve housing, the armature tube, the inlet connection and the outlet connection form a single valve part, i.e. they form an integral part. Thereby a major part of the valve can be manufactured in a single manufacturing step, and the manufacturing costs of the valve can thereby be reduced. It should be noted that in the present context the term 'single valve part' should be interpreted to mean a part which is manufactured in a single process. Thus, a part which is made from two parts which have subsequently been joined to each other, e.g. by means of welding, should not be regarded as a 'single valve part' in the present context.

As described above, the skilled person would normally manufacture the valve housing and the armature tube from different materials, i.e. he would select a wear resistant material, such as austenitic stainless steel for the armature tube, and a cheap material, which can easily be processed, such as brass or aluminium, for the valve housing. If he were to manufacture the valve housing from austenitic stainless steel, he would believe that the manufacturing costs of the valve would become too high. On the other hand, if he were to manufacture the armature tube from brass or aluminium, he would believe that he would not obtain a sufficiently thin armature tube with a sufficient wear resistance. Therefore, the skilled person would not consider providing a single valve part which includes the valve housing and the armature tube. However, the inventors of the present invention have discovered that it is possible to compensate for a thicker armature tube by carefully controlling the energy supply to the coil, and that it is therefore possible to manufacture the armature tube from a cheaper and softer material, thereby allowing the armature tube and the valve housing to be made from the same material.

The flow path through the valve from the fluid inlet to the fluid outlet, when the valve is in the open position, i.e. when the valve closing element does not abut the valve seat, does not pass through the windings of the coil. Thereby it is possible to replace the coil or perform maintenance to the coil without risking that fluid leaks out of the valve. This is a great advantage.

The valve may be a solenoid valve.

The single valve part may further include the valve seat. According to this embodiment, the valve housing, the armature tube, the inlet connection, the outlet connection and the valve seat form an integral part. Thereby an even larger part of the valve is made in one piece, thereby reducing the number of parts of the valve and reducing the manufacturing costs even further.

As an alternative, the valve seat may be formed in a separate valve seat element arranged inside the valve housing.

In this case the valve seat element may be arranged movably inside the valve housing in such a manner that the valve seat element and the valve housing in combination form a check valve allowing reverse fluid flow through the valve from the outlet opening to the inlet opening. According to this embodiment, when the pressure at the outlet opening reaches a sufficiently high level, the valve seat element is moved inside the valve housing, due to the pressure. Thereby a reverse flow channel through the valve, from the outlet opening to the inlet opening, is opened. Fluid may then flow through the reverse flow channel in order to decrease the pressure at the outlet opening, relative to the pressure at the inlet opening. When the pressure at the outlet opening has once again decreased to a level which is not sufficient to move the valve seat element, the valve seat element moves back to its original position, and the reverse flow channel is closed.

The valve seat element may be provided with a through-going bore which forms part of the flow path through the valve from the inlet opening to the outlet opening. According to this embodiment, fluid passes through the valve seat element, via the through-going bore, when the valve is in an open position during normal operation. When the check valve provided by the valve seat element and the valve housing is activated as described above, the through-going bore may advantageously be blocked, e.g. by means of the valve closing element, thereby preventing a forward fluid flow through the valve while a reverse fluid flow is allowed.

The valve may further comprise mechanical biasing means biasing the valve closing element in a direction towards or away from the valve seat. The mechanical biasing means may be or comprise a spring, such a compressible spring or a torsion spring. Alternatively, the mechanical biasing means may be or comprise other suitable devices which are capable of biasing or pushing the valve closing element towards or away from the valve seat.

In the case that the mechanical biasing means is biasing the valve closing element in a direction towards the valve seat, the valve closing element will be arranged in abutment with the valve seat when the coil is de-energized, and the valve will be in a closed position. Energizing the coil will, in this case, cause the valve closing element to move away from the abutment position, thereby opening the valve. Such a valve is sometimes referred to as a 'normally closed' or NC valve.

In the case that the mechanical biasing means is biasing the valve closing element in a direction away from the valve seat, the valve closing element will not be arranged in abutment with the valve seat when the coil is de-energized, and the valve will be in an open position. Energizing the coil will, in this case, cause the valve closing element to move towards the valve seat and into abutment with the valve seat, thereby closing the valve. Such a valve is sometimes referred to as a 'normally open' or NO valve.

The single valve part may be made from hot stamped metal, such as hot stamped aluminium or hot stamped brass. This is an advantage, because it is easy to manufacture relatively complex forms by means of a hot stamping process (near net shaping), and subsequently machining the surfaces which require fine tolerances. Furthermore, brass is known to be compatible to most refrigerants, and is therefore a suitable material for a valve which is to be used in a refrigeration system. As an alternative, other materials may be used for the single valve part, e.g. aluminium, stainless steel, etc. To this end, aluminium is attractive due to its low cost per volume.

The valve closing element may have a substantially spherical shape. It is easy to manufacture a spherical element in a precise manner, and a simple mass produced part, such as a ball for a ball bearing, could be used. This reduces the costs of the valve. Furthermore, if the valve closing element is made from a material which is harder than the material of the valve seat, the valve closing element will deform the valve seat, during operation, to match the geometry of the valve closing element. Thereby it is ensured that the valve is tight when it is in the closed position.

The coil may be removably mounted on the armature tube. According to this embodiment, it is possible to remove the coil, e.g. in order to replace the coil or in order to perform maintenance to the coil. To this end it is important that the coil is not arranged inside the valve housing, and that the flow path through the valve from the inlet opening to the outlet opening does not pass through the windings of the coil. The coil may, e.g., be mounted on the armature tube by means of a snap fit connection or a similar kind of connection allowing the coil to be easily mounted on and detached from the armature tube.

The valve closing element may form part of the armature. The valve closing element may, e.g., be a suitably shaped end part of the armature. According to this embodiment, the armature is simply moved directly into and out of abutment with the valve seat during normal operation of the valve. This even further reduces the number of parts of the valve.

As an alternative, the armature and the valve closing element may form separate parts which are mechanically connected to each other in such a manner that movements of the armature are transferred into movements of the valve closing element. The connection between the armature and the valve closing element may, in this case, be 'one-to-one' in the sense that moving the armature a given distance in a given direction will cause the valve closing element to move the same distance in the same direction. As an alternative, a servo-like connection may be provided between the armature and the valve closing element. In this case the valve closing element may be moved a distance which is shorter or a longer than the distance which the armature is moved.

According to a second aspect the invention provides a method for manufacturing a magnetic valve, the method comprising the steps of:
  providing a single valve part including at least a valve housing, an armature tube, an inlet connection and an outlet connection,
  providing a valve seat inside the valve housing,
  mounting a valve closing element movably inside the valve housing,
  mounting an armature movably inside the armature tube, said armature being connected to the valve closing element,
  mounting an armature top on the armature tube, and
  mounting a coil externally to the armature tube in such a manner that the armature tube and the armature are arranged inside the windings of the coil.

It should be noted that a person skilled in the art would readily recognise that any feature described in combination with the first aspect of the invention could also be combined with the second aspect of the invention, and vice versa. Thus, the method according to the second aspect of the invention could advantageously be used for manufacturing a magnetic valve according to the first aspect of the invention. The remarks set forth above with reference to the first aspect of the invention are therefore equally applicable here.

The step of providing a single valve part may include the step of providing a valve seat, the valve seat thereby forming part of the single valve part. This has already been described above.

The step of providing a single valve part may comprise the steps of:
  hot stamping a metal piece, and
  machining the hot stamped metal piece in order to provide bores forming a flow path through the valve.

The metal piece may, e.g., be made from brass. As an alternative, other suitable metals may be used, such as aluminium or stainless steel.

Hot stamping a metal piece and subsequently machining the hot stamped metal piece is a very easy and cost effective manner of providing the single valve part, as described above.

As an alternative, the single valve part could, e.g., be provided by casting the valve part, or by extruding a profile and subsequently machining the extruded part.

According to a third aspect the invention provides a magnetic valve comprising:
- a valve housing,
- an armature tube having an armature made from a soft magnetic material arranged movably therein,
- a coil arranged externally to the armature tube in such a manner that the armature tube and the armature are arranged inside the windings of the coil,
- an inlet connection defining an inlet opening allowing a flow of fluid to enter the valve,
- an outlet connection defining an outlet opening allowing a flow of fluid to leave the valve,
- a valve seat,
- a valve closing element being movable between a position in which it abuts the valve seat, thereby closing the valve and preventing a fluid flow from the inlet opening to the outlet opening, and positions in which it does not abut the valve seat, thereby allowing fluid to pass through the valve from the inlet opening to the outlet opening, via the valve seat, said valve closing element being connected to the armature in such a manner that movements of the armature inside the armature tube determines the position of the valve closing element relative to the valve seat, wherein at least the valve housing, the armature tube, the inlet connection and the outlet connection form a single valve part, and wherein the armature tube has a closed end part.

It should be noted that a skilled person would readily recognise that any feature described in combination with the first and second aspects of the invention could also be combined with the third aspect of the invention, and that the remarks set forth above with reference to the first and second aspects of the invention therefore apply equally to the third aspect of the invention. In particular, it is noted that the valve according to the third aspect of the invention may be manufactured by means of the method according to the second aspect of the invention.

The valve according to the third aspect of the invention may advantageously be used in a vapour compression system, such as a refrigeration system, an air condition system or a heat pump.

In the valve according to the third aspect of the invention, the armature tube has a closed end part, e.g. in the form of a closed top. Thereby there are no joints between the armature tube and an armature top or another valve part used for closing and/or sealing the end part of the armature tube. This is an advantage because it ensures that the valve is fluid tight in the region of the closed end part, thereby considerably reducing the risk of fluid leaking from the valve, even in case of very high pressures inside the valve.

The valve according to the third aspect of the invention may also be a solenoid valve.

The valve seat may be formed in a separate valve seat element arranged movably inside the valve housing in such a manner that the valve seat element and the valve housing in combination form a check valve allowing a reverse fluid flow through the valve from the outlet opening to the inlet opening. This has already been described above with reference to the first aspect of the invention.

As an alternative, a valve seat element having the valve seat formed therein may be mounted in a substantially fixed manner inside the valve housing.

The valve may further comprise mechanical biasing means biasing the valve closing element in a direction towards or away from the valve seat. The mechanical biasing means may, e.g., be or comprise a spring, such as a compressible spring or a torsion spring. In the case that the mechanical biasing means biases the valve closing element in a direction towards the valve seat, the valve is of a so-called normally closed (NC) type. In the case that the mechanical biasing means biases the valve closing element in a direction away from the valve seat, the valve is of a so-called normally open (NO) type. This has already been described above with reference to the first aspect of the invention.

The single valve part may be made from hot stamped metal, such as hot stamped aluminium or hot stamped brass. As described above, this minimises the manufacturing costs of the valve.

The valve closing element may have a substantially spherical shape. As described above, this makes it easy to manufacture the valve closing element in a precise manner.

The coil may be removably mounted on the armature tube. As described above, this makes it possible to remove the coil, e.g. in order to replace the coil or in order to perform maintenance to the coil, without risking leakage of fluid from the valve.

The valve closing element may form part of the armature. This has already been described above.

The valve may further comprise an armature top mounted inside the armature tube at or near the closed end part of the armature tube, said armature top being made from a soft magnetic material. According to this embodiment, the armature top is arranged inside the armature tube in a region which is completely closed and fluid tight, due to the closed end part. Accordingly, the armature top is substantially encapsulated by the armature tube, and there are no joints between the armature tube and the armature top, which could potentially cause leaks in the valve.

According to a fourth aspect the invention provides a method for manufacturing a magnetic valve, the method comprising the steps of:
- providing a single valve part including at least a valve housing, an inlet connection, an outlet connection and an armature tube, said armature tube comprising a closed end part,
- mounting an armature top inside the armature tube at or near the closed end part of the armature tube,
- mounting an armature movably inside the armature tube,
- mounting a valve closing element movably inside the valve housing, said valve closing element being connected to the armature,
- mounting a valve seat element inside the valve housing, said valve seat element having a valve seat formed therein, and
- mounting a coil externally to the armature tube in such a manner that the armature tube and the armature are arranged inside the windings of the coil.

It should be noted that a person skilled in the art would readily recognise that any feature described in combination with the first, second or third aspects of the invention could also be combined with the fourth aspect of the invention, and vice versa. Thus, the method according to the fourth aspect of the invention could advantageously be used for manufacturing a magnetic valve according to the first aspect of the invention, or according to the third aspect of the invention.

In the method according to the fourth aspect of the invention, a single valve part, as defined above, is initially provided. The armature tube, forming part of the single valve part, comprises a closed end part. As described above, this minimises the risk of fluid leaking from the valve.

Next an armature top is mounted inside the armature tube at or near the closed end part. Thus, the armature top is accommodated inside the armature tube, and is substantially encapsulated by the armature tube, due to the closed end part.

Then an armature, a valve closing element and a valve seat element having a valve seat formed therein are mounted inside the armature tube and the valve housing, respectively, i.e. inside the single valve part.

Finally a coil is mounted externally to the armature tube in such a manner that the armature tube and the armature are arranged inside the windings of the coil. Since the coil is mounted externally to the armature tube, and thereby to the single valve part, it is possible to remove the coil without risking that fluid leaks from the valve, as described above.

According to one embodiment, the armature top, the armature, the valve closing element and the valve seat element may be introduced into the single valve part via an opening formed in the inlet connection or in the outlet connection. In order to allow fluid to flow through the valve, an inlet opening is formed in the inlet connection, allowing a flow of fluid to enter the valve, and an outlet opening is formed in the outlet connection, allowing a flow of fluid to leave the valve. When the armature top, the armature, the valve closing element and the valve seat element are introduced into the valve part via one of these openings, the single valve part may be designed in such a manner that the inlet opening and the outlet opening are the only openings formed in the single valve part. This considerably reduces the risk of fluid leaking from the valve.

The step of providing a single valve part may comprise the steps of:
  hot stamping a metal piece, and
  machining the hot stamped metal piece in order to provide bores forming a flow path through the valve.

The metal piece may, e.g., be made from brass or aluminium. As an alternative, other suitable metals may be used, such as stainless steel.

As an alternative to hot stamping, the single valve part could, e.g., be provided by casting the valve part, or by extruding a profile and subsequently machining the extruded part.

BRIEF DESCRIPTION OF THE DRAWINGS

The invention will now be described in further detail with reference to the accompanying drawings in which.

DETAILED DESCRIPTION

Figure 1:
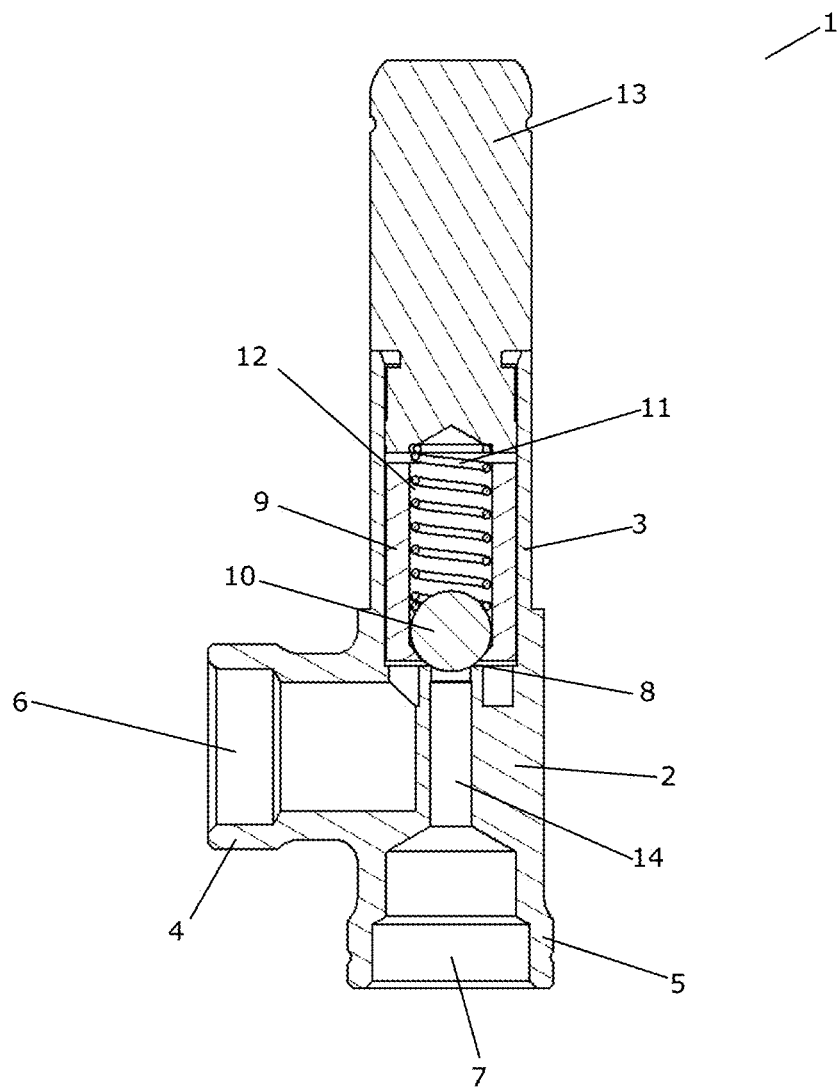
FIG. 1 is a cross sectional view of a magnetic valve according to a first embodiment of the invention, in a closed position.
Figure 2:
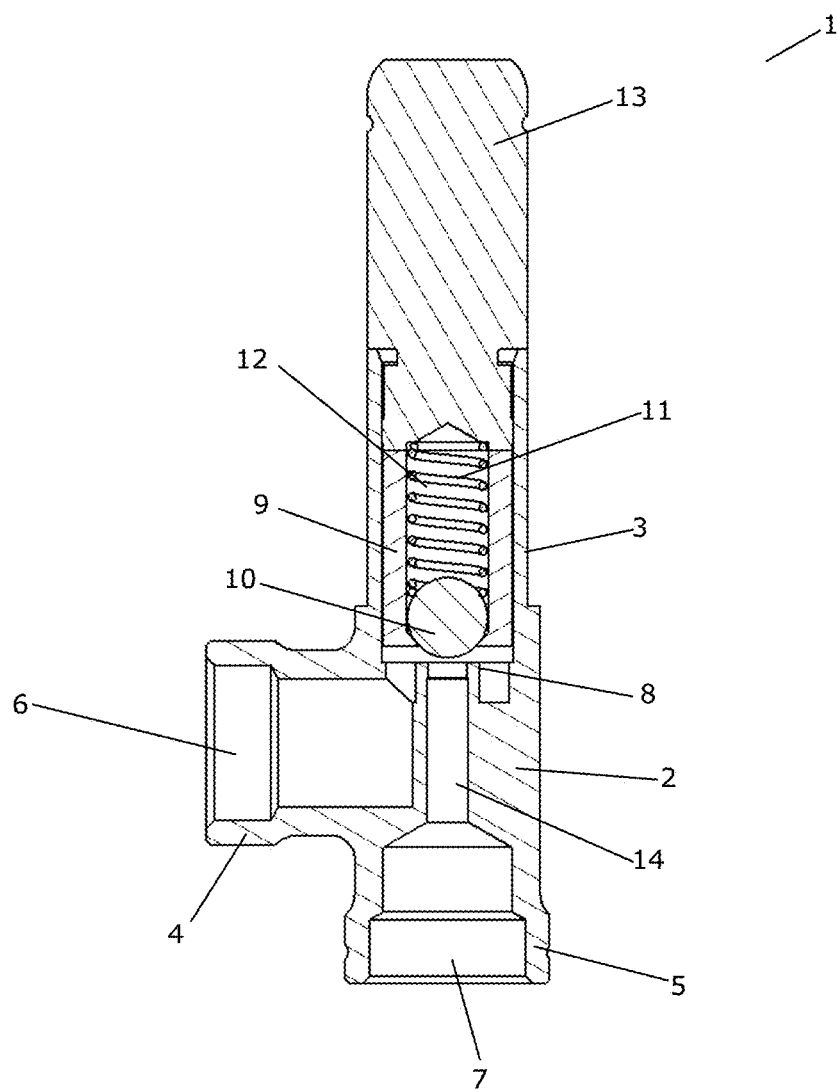
FIG. 2 is a cross sectional view of the magnetic valve of FIG. 1, in an open position.

FIGS. 1 and 2 are cross sectional views of a magnetic valve 1 according to a first embodiment of the invention. FIG. 1 shows the valve 1 in a closed position, and FIG. 2 shows the valve 1 in an open position. The valve 1 comprises a valve housing 2, an armature tube 3, an inlet connection 4 and an outlet connection 5 forming a single valve part, or made in a single piece. The inlet connection 4 and the outlet connection 5 are in the form of tubes or pipes protruding from the valve housing 2, thereby allowing piping of a flow system having the valve 1 arranged therein to be fitted onto the inlet connection 4 and the outlet connection 5 in order to allow fluid to be supplied to and delivered from the valve 1. This will be described further below.

The inlet connection 4 defines an inlet opening 6 and the outlet connection 5 defines an outlet opening 7. During operation of the valve 1, fluid enters the valve 1 via the inlet opening 6 and leaves the valve 1 via the outlet opening 7. This will be described further below.

A valve seat 8 is arranged in an interior part of the valve housing 2. In the embodiment of FIG. 1 the valve seat 8 forms part of the single valve part which also includes the valve housing 2, the armature tube 3, the inlet connection 4 and the outlet connection 5.

An armature 9 is arranged movably inside the armature tube 3. Thus, the armature 9 can move along an axial direction defined by the armature tube 3, towards and away from the valve seat 8, and the movements of the armature 9 are guided by the armature tube 3. The armature 9 is made from a soft magnetic material, i.e. it becomes magnetic only when subjected to a magnetic field.

A valve closing element 10 having a spherical shape is connected to the armature 9 in such a manner that it follows the axial movements of the armature 9 inside the armature tube 3. A compressible spring 11 is arranged inside a bore 12 formed in the armature 9, between the valve closing element 10 and an armature top 13, which is mounted on the armature tube 3 by means of a snap fit connection. The compressible spring 11 pushes the valve closing element 10 towards the valve seat 8.

In FIG. 1 the valve closing element 10 is arranged in abutment with the valve seat 8. Thereby fluid is prevented from passing through the valve 1 from the inlet opening 6 to the outlet opening 7, via the valve seat 8, and the valve 1 is therefore in a closed position.

When it is desired to open the valve 1, a coil (not shown) is energized, i.e. an electrical current is supplied to the coil. The coil is arranged externally to the armature tube 3 in such a manner that the armature tube 3 and the armature 9 are arranged inside the windings of the coil. When the coil is energized, a magnetic field is induced inside the windings of the coil, i.e. in the region where the armature 9 is arranged. Thereby the armature 9 becomes magnetic, and this causes the armature 9 to move in a direction away from the valve seat 8, against the forces of the compressible spring 11. Since the valve closing element 10 is connected to the armature 9 as described above, the valve closing element 10 is also moved in a direction away from the valve seat 8 and out of abutment with the valve seat 8. This position is illustrated in FIG. 2.

Thus, in FIG. 2, a fluid passage is defined at the valve seat 8, and the valve 1 is in an open position. Accordingly, fluid is allowed to enter the valve 1 via inlet opening 6, pass through the valve 1 via the valve seat 8 and through-going bore 14, and leave the valve 1 via outlet opening 7. When it is once again desired to close the valve 1, the coil is de-energized, i.e. the supply of electrical current to the coil is interrupted. Thereby the magnetic field inside the windings of the coil is no longer present, and the compressible spring 11 will push the armature 9 and the valve closing element 10 towards the valve seat 8 until the valve closing element 10 is once again arranged in abutment with the valve seat 8, and the valve 1 is closed.

Thus, the valve 1 can be moved between the closed position illustrated in FIG. 1 and the open position illustrated in FIG. 2, simply by energizing and de-energizing the coil.

It is an advantage that the valve housing 2, the armature tube 3, the inlet connection 4 and the outlet connection 5 form a single valve part or an integral piece, since the number of separate parts to be manufactured and assembled in order to manufacture the valve 1 is thereby minimised. This reduces the manufacturing costs of the valve 1. Since the valve seat 8 also forms part of the single valve part, the component count is even further reduced, and thereby the manufacturing costs are also reduced even further.

It is also an advantage that the flow path through the valve 1 from the inlet opening 6 to the outlet opening 7, via the valve seat 8 and the through-going bore 14, as described above, does not include the part of the valve 1 where the coil is positioned, because it is thereby possible to gain access to the coil, e.g. in order to replace the coil or perform maintenance to the coil, without risking that fluid leaks from the valve 1.

Figure 3:
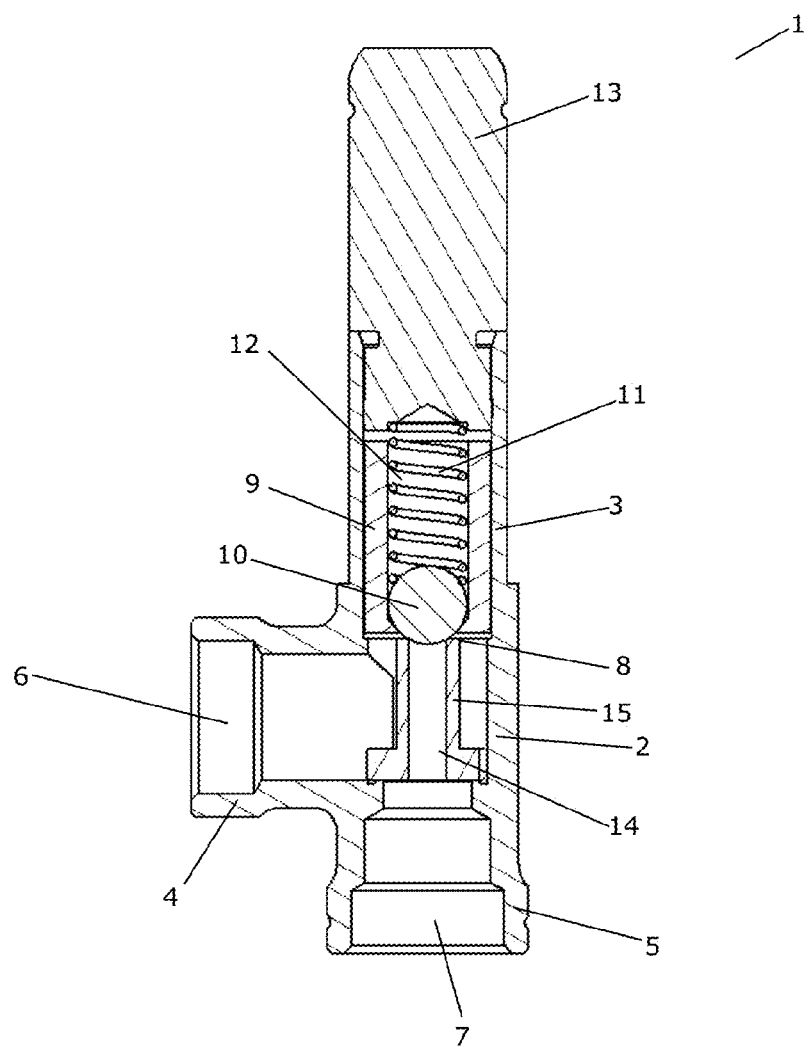
FIG. 3 is a cross sectional view of a magnetic valve according to a second embodiment of the invention, in a closed position.
Figure 4:
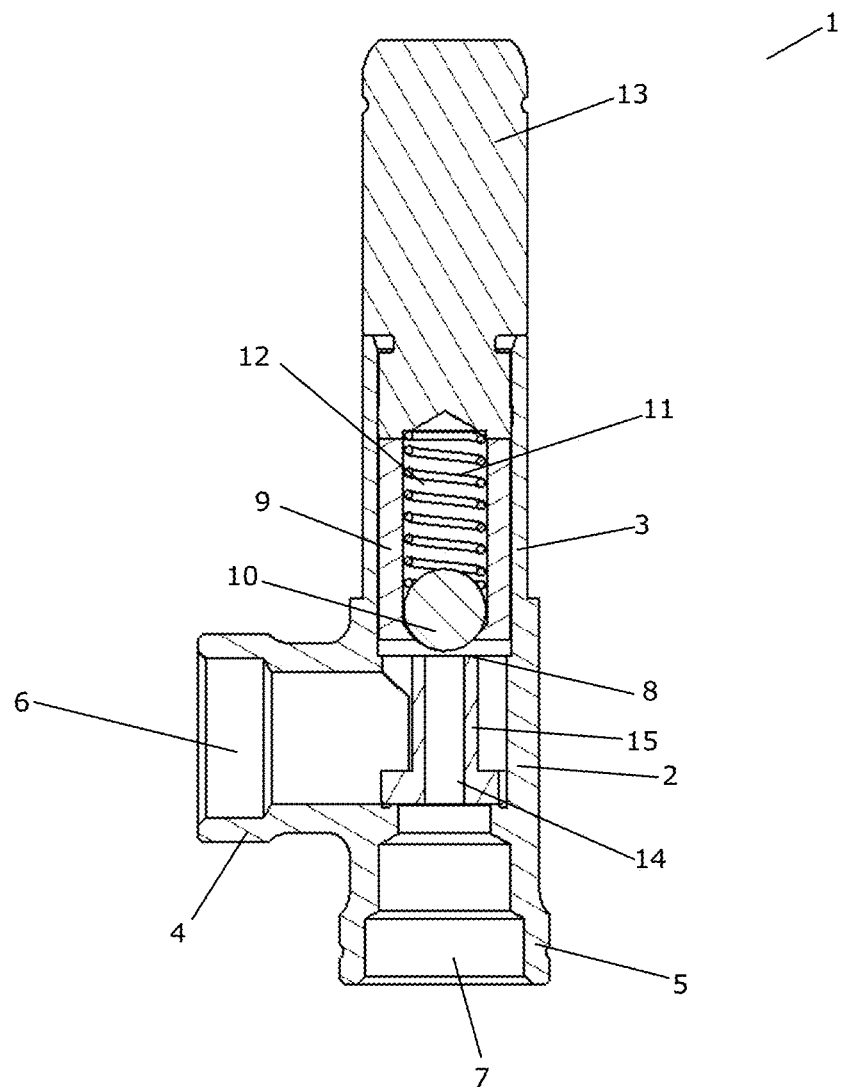
FIG. 4 is a cross sectional view of the magnetic valve of FIG. 3, in an open position.
Figure 5:
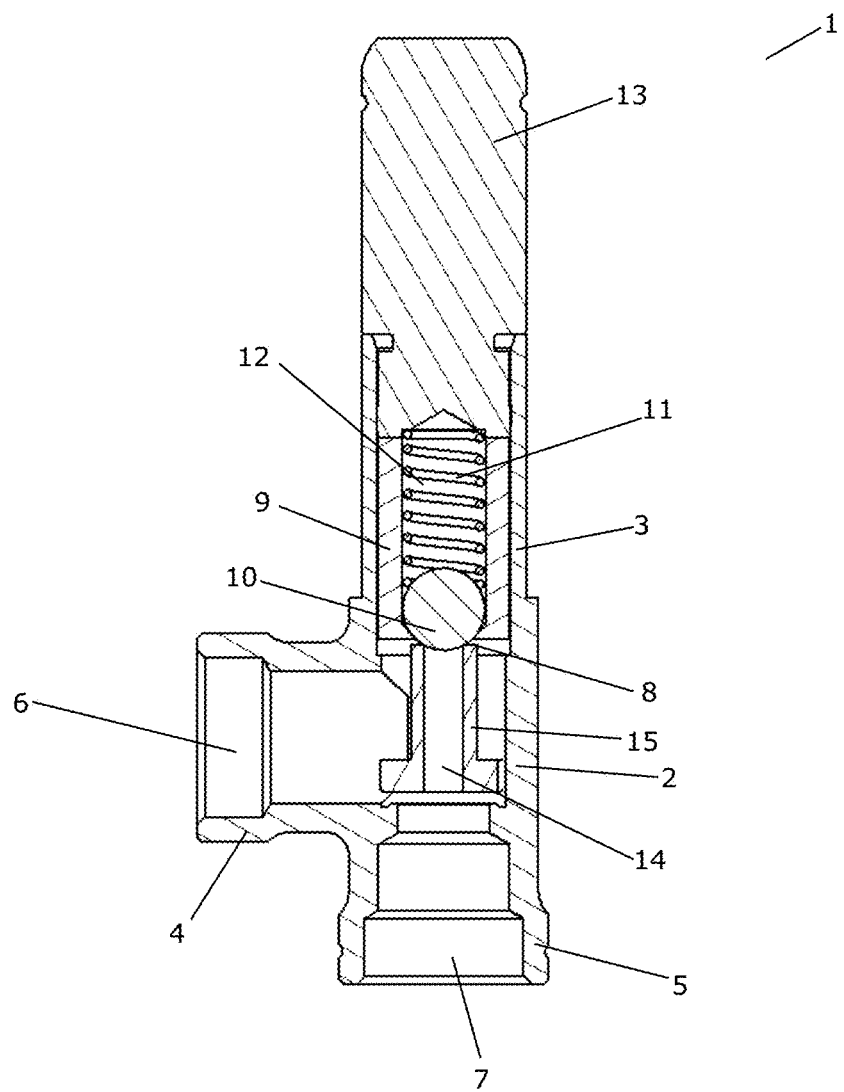
FIG. 5 is a cross sectional view of the magnetic valve of FIGS. 3 and 4, in a reverse flow position.

FIGS. 3-5 are cross sectional views of a magnetic valve 1 according to a second embodiment of the invention. The embodiment shown in FIGS. 3-5 is very similar to the embodiment shown in FIGS. 1 and 2, and it will therefore not be described in detail here.

In the valve 1 shown in FIGS. 3-5 the valve seat 8 is formed in a separate valve seat element 15. The through-going bore 14 is also formed in the valve seat element 15. The valve seat element 15 is arranged movably inside the valve housing 2. This will be described further below. FIG. 3 shows the valve 1 in a closed position, FIG. 4 shows the valve 1 in an open position, and FIG. 5 shows the valve 1 in a reverse flow position.

During normal operation, the valve 1 of FIGS. 3-5 is operated essentially as described above with reference to FIGS. 1 and 2.

If the pressure at the outlet opening 7 exceeds a certain threshold value, the pressure will be able to push the valve seat element 15 in a direction towards the armature 9. Thereby a reverse flow passage is opened at a lower part of the valve seat element 15, as illustrated in FIG. 5. Thereby a reverse fluid flow is allowed through the valve 1 from the outlet opening 7 to the inlet opening 6, via the reverse flow passage created by the movement of the valve seat element 15. Thus, the valve seat element 15 and the valve housing 2 in combination form a check valve.

The valve 1 may be controlled in such a manner that the coil is energized if it is determined that the pressure at the outlet opening 7 is exceeding the threshold value. Thereby the armature 9 and the valve closing element 10 are moved against the forces of the compressible spring 11 to the position shown in FIGS. 4 and 5. Thereby the forces provided by the pressure at the outlet opening 7 only needs to move the valve seat element 15 in order to open the reverse flow passage.

Figure 6:
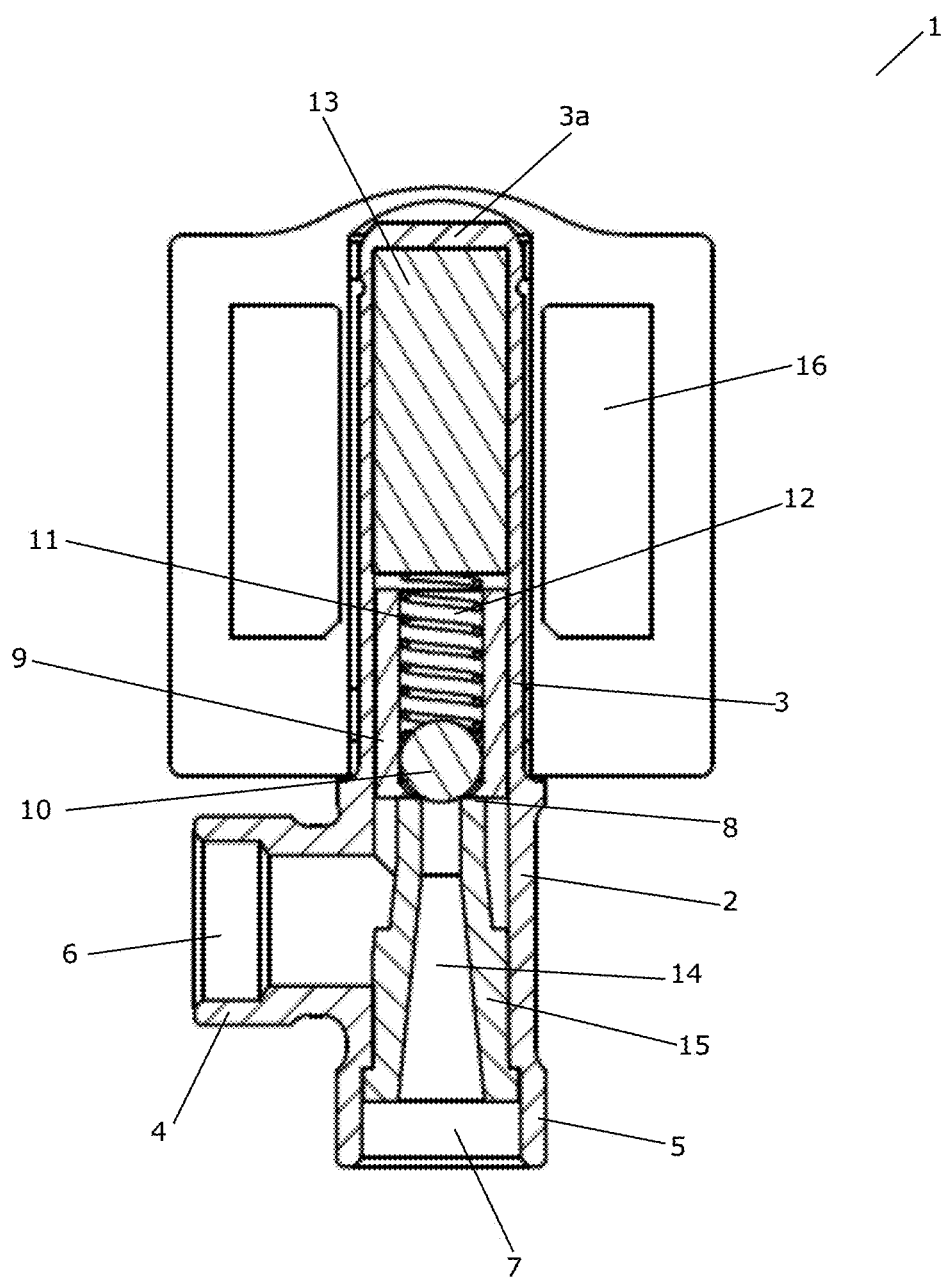
FIG. 6 is a cross sectional view of a magnetic valve according to a third embodiment of the invention, in a closed position.
Figure 7:
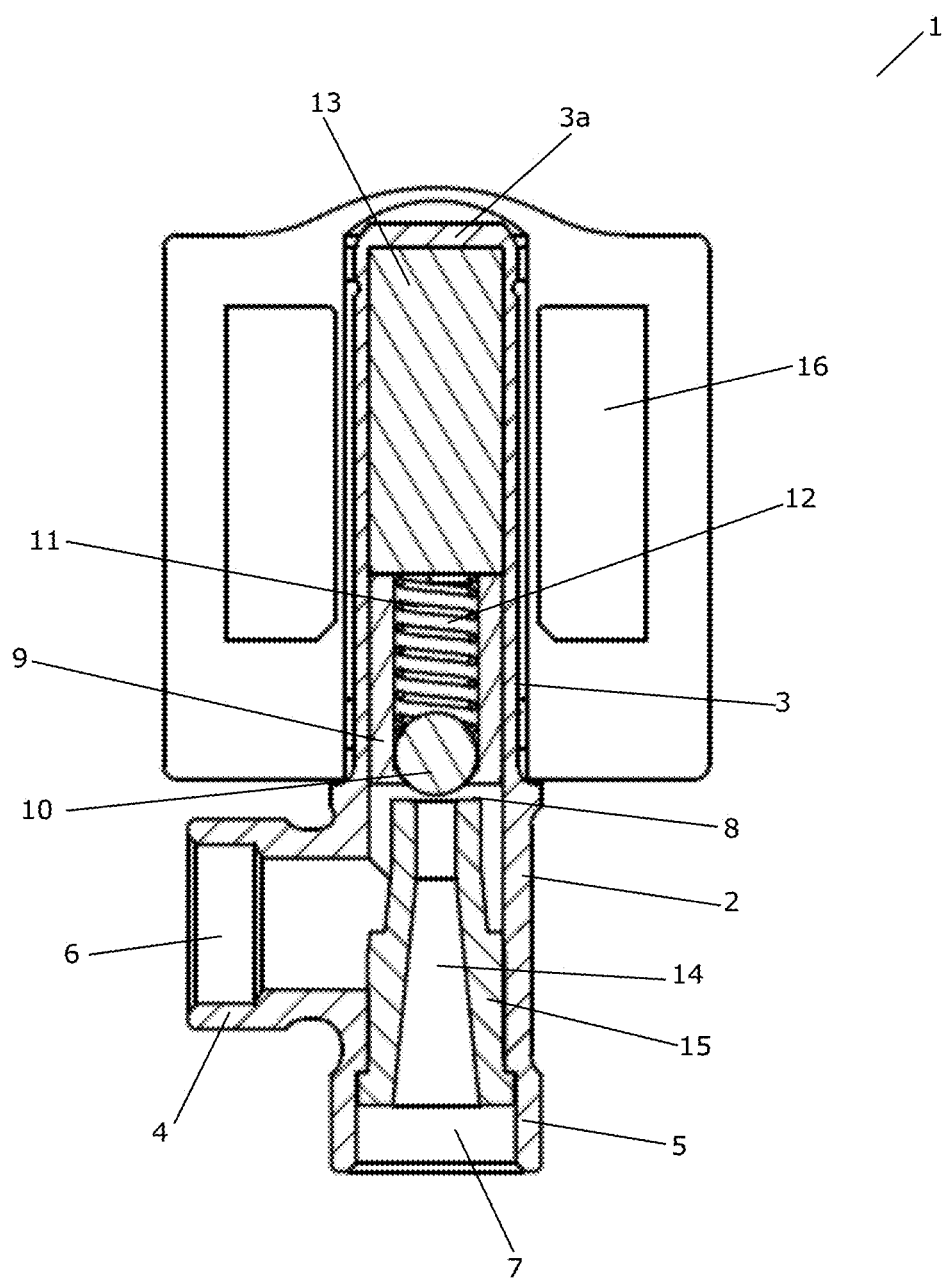
FIG. 7 is a cross sectional view of the magnetic valve of FIG. 6, in an open position.

FIGS. 6 and 7 are cross sectional views of a magnetic valve 1 according to a third embodiment of the invention. The embodiment of FIGS. 6 and 7 is very similar to the embodiments shown in FIGS. 1-5, and it will therefore not be described in detail here.

In the valve 1 shown in FIGS. 6 and 7, the armature tube 3 comprises a closed end part 3a, and the armature top 13 is arranged inside the armature tube 3, abutting the closed end part 3a. Thus, the armature top 13 is substantially enclosed by the armature tube 3, and the risk of fluid leaking from the valve 1 in the region of the closed end part 3a is essentially eliminated.

FIG. 6 shows the valve 1 in a closed position, and FIG. 7 shows the valve 1 in an open position. During normal operation, the valve 1 of FIGS. 6 and 7 is operated essentially as described above with reference to FIGS. 1 and 2.

In FIGS. 6 and 7 the coil 16 mounted exterior to the armature tube 3 is shown. It is clear from FIGS. 6 and 7 that it is possible to remove the coil 16 without risking that fluid leaks from the valve 1, since the single valve piece, including the valve housing 2 and the armature tube 3, remains intact even if the coil 16 is removed.

Although various embodiments of the present invention have been described and shown, the invention is not restricted thereto, but may also be embodied in other ways within the scope of the subject-matter defined in the following claims.

What is claimed is:

1. A magnetic valve comprising:
   a valve housing,
   an armature tube having an armature made from a soft magnetic material arranged movably therein,
   a coil arranged externally to the armature tube in such a manner that the armature tube and the armature are arranged inside the windings of the coil,
   an inlet connection defining an inlet opening allowing a flow of fluid to enter the valve,
   an outlet connection defining an outlet opening allowing a flow of fluid to leave the valve,
   a valve seat,
   a valve closing element being movable between a position in which it abuts the valve seat, thereby closing the valve and preventing a fluid flow from the inlet opening to the outlet opening, and positions in which it does not abut the valve seat, thereby allowing fluid to pass through the valve from the inlet opening to the outlet opening, via the valve seat, said valve closing element being connected to the armature in such a manner that movements of the armature inside the armature tube determines the position of the valve closing element relative to the valve seat,
   wherein at least the valve housing, the armature tube, the inlet connection and the outlet connection form a single valve part, and wherein the armature tube has a closed end part, and
   wherein the valve closing element is configured to be introduced into the valve housing via the inlet opening or the outlet opening.

2. The valve according to claim 1, wherein the valve is a solenoid valve.

3. The valve according to claim 1, wherein the valve seat is formed in a separate valve seat element arranged movably inside the valve housing in such a manner that the valve seat element and the valve housing in combination form a check valve allowing a reverse fluid flow through the valve from the outlet opening to the inlet opening.

4. The valve according to claim 1, further comprising mechanical biasing means biasing the valve closing element in a direction towards or away from the valve seat.

5. The valve according to claim 1, wherein the single valve part is made from hot stamped metal.

6. The valve according to claim 1, wherein the valve closing element has a substantially spherical shape.

7. The valve according to claim 1, wherein the coil is removably mounted on the armature tube.

8. The valve according to claim 1, wherein the valve closing element forms part of the armature.

9. The valve according to claim 1, further comprising an armature top mounted inside the armature tube at or near the closed end part of the armature tube, said armature top being made from a soft magnetic material.

10. A method for manufacturing a magnetic valve, the method comprising the steps of:
   providing a single valve part including at least a valve housing, an inlet connection defining an inlet opening, an outlet connection defining an outlet opening and an armature tube, said armature tube comprising a closed end part,
   mounting an armature top inside the armature tube at or near the closed end part of the armature tube,
   mounting an armature movably inside the armature tube,
   introducing a valve closing element into the valve housing via the inlet opening or the outlet opening,
   mounting the valve closing element movably inside the valve housing, said valve closing element being connected to the armature,
   mounting a valve seat element inside the valve housing, said valve seat element having a valve seat formed therein, and
   mounting a coil externally to the armature tube in such a manner that the armature tube and the armature are arranged inside the windings of the coil.

11. The method according to claim 10, wherein the armature top, the armature and the valve seat element are introduced into the single valve part via the inlet opening or the outlet opening.

12. The method according to claim 10, wherein the step of providing a single valve part comprises the steps of:
   hot stamping a metal piece, and
   machining the hot stamped metal piece in order to provide bores forming a flow path through the valve.

13. A magnetic valve comprising:
   a valve housing,
   an armature tube having an armature made from a soft magnetic material arranged movably therein,
   a coil arranged externally to the armature tube in such a manner that the armature tube and the armature are arranged inside the windings of the coil,
   an inlet connection defining an inlet opening allowing a flow of fluid to enter the valve,
   an outlet connection defining an outlet opening allowing a flow of fluid to leave the valve,
   a valve seat,
   a valve closing element being movable between a position in which it abuts the valve seat, thereby closing the valve and preventing a fluid flow from the inlet opening to the outlet opening, and positions in which it does not abut the valve seat, thereby allowing fluid to pass through the valve from the inlet opening to the outlet opening, via the valve seat, said valve closing element being connected to the armature in such a manner that movements of the armature inside the armature tube determines the position of the valve closing element relative to the valve seat,
   wherein at least the valve housing, the armature tube, the inlet connection and the outlet connection form a single valve part, and wherein the flow path through the valve from the inlet opening to the outlet opening does not pass through the windings of the coil, and
   wherein the valve closing element is configured to be introduced into the valve housing via the inlet opening or outlet opening.

14. The valve according to claim 13, wherein the valve is a solenoid valve.

15. The valve according to claim 13, wherein the single valve part further includes the valve seat.

16. The valve according to claim 13, wherein the valve seat is formed in a separate valve seat element arranged inside the valve housing.

17. The valve according to claim 16, wherein the valve seat element is arranged movably inside the valve housing in such a manner that the valve seat element and the valve housing in combination form a check valve allowing reverse fluid flow through the valve from the outlet opening to the inlet opening.

18. The valve according to claim 13, further comprising mechanical biasing means biasing the valve closing element in a direction towards or away from the valve seat.

19. The valve according to claim 13, wherein the single valve part is made from hot stamped metal.

20. The valve according to claim 13, wherein the valve closing element has a substantially spherical shape.

21. The valve according to claim 13, wherein the coil is removably mounted on the armature tube.

22. The valve according to claim 13, wherein the valve closing element forms part of the armature.

23. A method for manufacturing a magnetic valve, the method comprising the steps of:
   providing a single valve part including at least a valve housing, an armature tube, an inlet connection defining an inlet opening and an outlet connection defining an outlet opening,
   providing a valve seat inside the valve housing,
   introducing a valve closing element into the valve housing via the inlet opening or outlet opening,
   mounting the valve closing element movably inside the valve housing,
   mounting an armature movably inside the armature tube, said armature being connected to the valve closing element,
   mounting an armature top on or inside the armature tube, and
   mounting a coil externally to the armature tube in such a manner that the armature tube and the armature are arranged inside the windings of the coil.

24. The method according to claim 23, wherein the step of providing a single valve part includes the step of providing a valve seat, the valve seat thereby forming part of the single valve part.

25. The method according to claim 23, wherein the step of providing a single valve part comprises the steps of:
   hot stamping a metal piece, and
   machining the hot stamped metal piece in order to provide bores forming a flow path through the valve.

* * * * *